US006234728B1

(12) United States Patent
Brun-Picard et al.

(10) Patent No.: US 6,234,728 B1
(45) Date of Patent: May 22, 2001

(54) DRILLING HEAD WITH VIBRATORY EFFECT

(75) Inventors: Daniel Brun-Picard, Cabries (FR); Alexandre Gouskov, Moscow (RU)

(73) Assignee: Institut National Polytechnique de Grenoble, Grenoble Cedex (FR)

( * ) Notice: Subject to any disclaimer, the term of this patent is extended or adjusted under 35 U.S.C. 154(b) by 0 days.

(21) Appl. No.: 09/477,456

(22) Filed: Jan. 4, 2000

Related U.S. Application Data (63) Continuation of application No. PCT/FR98/01454, filed on Jul. 7, 1998.

(30) Foreign Application Priority Data

Jul. 7, 1997 (FR) .................................................. 97 08601

(51) Int. Cl.[7] .................................................. B23B 27/22
(52) U.S. Cl. .................................. 408/17; 408/56; 408/59
(58) Field of Search .................................. 408/56, 57, 59, 408/17

(56) References Cited

U.S. PATENT DOCUMENTS

| 2,453,136 | 11/1948 | Karweit . |
| 3,303,522 | * 2/1967 | Kumabe et al. ........................ 408/17 |
| 5,702,211 | * 12/1997 | Roemer et al. ........................ 408/56 |

FOREIGN PATENT DOCUMENTS

| 0 292 651 | 11/1988 | (EP) . |
| 0 489 359 | 6/1992 | (EP) . |
| 0182008 | * 10/1984 | (JP) ........................................ 408/17 |
| 0806276 | * 2/1981 | (SU) ........................................ 408/17 |
| 0844139 | * 7/1981 | (SU) ........................................ 408/17 |
| 1351724 | * 11/1987 | (SU) ........................................ 408/17 |
| 001646708 | * 5/1991 | (SU) ........................................ 408/17 |
| 99/02291 | 1/1999 | (WO) . |

OTHER PUBLICATIONS

Patent Abstract of Japan vol. 001, No. 082 (M–028), Jul. 29, 1977 & JP 52 024394 A (Shinei Seisakusho:KK), Feb. 23, 1977.

Verified Translation with verification and copy of WO 99/02291.

Forms PCT/IB/301; PCT/IB/304; PCT/IB/308; PCT/IB/332; PCT/IPEA/409.

\* cited by examiner

*Primary Examiner*—A. L. Wellington
*Assistant Examiner*—Monica S. Carter
(74) *Attorney, Agent, or Firm*—Smith, Gambrell & Russell (57) ABSTRACT

A mounting attachment for a penetrating tool such as a drilling head on a machine with a machining shaft includes a support provided with means for coupling to a machine; a tool holder provided with means for fixing a tool; means for axially guiding the tool holder relative to the support; means for linking in rotation the tool holder and the support; and elastically deformable suspension means for suspending the tool holder from the support, the suspension means allowing axial translation and self-sustaining reciprocating or vibrating axial movements of the tool holder resulting from a controlled displacement of the support with respect to a workpiece.

15 Claims, 7 Drawing Sheets

DRILLING HEAD WITH VIBRATORY EFFECT

This application is a continuation of International Application No. PCT/FR98/01454, filed Jul. 7, 1998 and designating the U.S. This PCT application is incorporated by reference in its entirety.

BACKGROUND OF THE INVENTION

The present invention relates to the field of operations of machining workpieces, such as making drillings, particularly very deep drillings.

DESCRIPTION OF THE RELATED ART

Drilling machines are known which comprise a mechanism designed, as the drilling head advances, to bring about forced reciprocating movements over a predetermined stroke, these forced movements causing the thickness of the chip to vary, allowing it to break up and thus making it easier to remove. In spite of these advantages, such mechanisms are complicated, bulky and expensive.

BRIEF SUMMARY OF THE INVENTION

The object of the present invention is to provide a penetrating-tool mounting attachment of a particularly simple structure which makes it possible to bring about reciprocating movements of the tool as it advances.

The attachment for mounting on a machine a penetrating tool such as a drilling head, having a machining axis, comprises, according to the invention, a support equipped with means of coupling it to a machine, a tool holder provided with means for attaching a tool, means for axially guiding the tool holder with respect to the support, means for rotationally connecting the tool holder and the support, and elastically deformable means for connecting the tool holder and the support in terms of axial translation, the said elastically deformable means of connection in axial translation being dimensioned such as to produce self-sustained reciprocating or vibrating axial movements of the tool holder during the controlled relative advance of the support with respect to the workpiece.

According to the invention, the mounting attachment may advantageously comprise means for adjusting the stiffness of the said elastically deformable means of connection in axial translation.

According to an alternative form of the invention, the said guide means comprise two axially deformable annular plates comprising an inner part and an outer part which are connected respectively to the support and to the tool holder and which are joined together by non-radial branches.

According to one alternative form of the invention, the said guide means comprise a ball-type slideway.

According to another alternative form of the invention, the said elastically deformable connecting means comprise at least one spring leaf arranged in a radial plane, which is fixed at two points spaced along its length to, on the one hand, the support and, on the other hand, the tool holder.

According to a preferred alternative form of the invention, the said elastically deformable means of connection in axial translation comprise two spring leaves arranged parallel to each other in a radial plane and one on each side of the axis, the said leaves being fixed to, on the one hand, the support and, on the other hand, the tool holder, at a mid-point and at two points spaced from this mid-point on each side thereof in the direction of their length, respectively.

According to the invention, means are preferably provided for adjusting the distance between the said points of attachment of the said spring leaf or leaves.

According to another alternative form of the invention, the said elastically deformable means of connection in axial translation comprise at least one essentially cylindrical spring.

According to the invention, the said cylindrical spring may advantageously comprise a cylinder which, in its wall, has offset openings so as to form peripheral portions which are elastically deformable in the axial direction.

According to the invention, the ends of the said cylindrical spring are preferably fixed to the support and to the tool holder, respectively.

According to the invention, the support preferably comprises a cylindrical part for coupling to the machine, extended by a cylindrical part into which the tool holder at least partially extends.

According to the invention, in an alternative form, the mounting attachment comprises means for conveying fluid to the tool, comprising a duct running axially through the support, a duct running axially through the tool holder and a pipe connecting the said ducts and which is axially deformable or flexible.

BRIEF DESCRIPTION OF THE SEVERAL VIEWS OF THE DRAWINGS

The present invention will be better understood from studying attachments for mounting on a machine a penetrating tool such as a drilling head, which are described by way of nonlimiting examples with reference to the drawing, in which.

DETAILED DESCRIPTION OF THE INVENTION

Referring to FIGS. 1 to 5, it may be seen that these depict an attachment, identified overall by reference 1, for mounting a penetrating tool consisting of a drilling head 2 on a machine 3 with a vertical machining axis.

The drilling head 1 comprises an axial support identified overall by the reference 4, which comprises a cylindrical part 5 engaged in a bore 6 of a chuck 7 of the machine 3 and immobilized in this bore 6 by a radial screw 8.

The support 4 further comprises a cylindrical part 9 which extends the cylindrical part 5 downwards, which is of larger diameter than this cylindrical part 5 and which is connected to the latter by a radial disk 10. This cylindrical part 9 comprises, essentially at its center, two opposed large openings 11 and two opposed flats 12 which are formed in the remaining upper parts over the openings 11.

Secured against the flats 12, via screws 13, are the vertical branches 14 of angle brackets 15, the horizontal branches 16 of which extend through the upper part of the openings 11 of the cylindrical part 9, the undersides of these branches 16 having aligned slideways 16a.

The mounting attachment 1 further comprises an axial tool holder 17 which comprises a cylinder 17a which runs axially inside the cylindrical part 9 of the support 4 some distance from its wall.

The upper part and the lower part of the cylinder 17a are connected to the upper part and to the lower part of the cylindrical part 9 of the support 4 on each side of the openings 11, by suspension and axial-guidance disks 18.

The disks 18 exhibit inner rings 19 fixed axially against shoulders 20 of the cylinder 17a, by virtue of nuts 21, and outer rings 22 fixed axially in the cylindrical part 9 of the support 4, between a shoulder 23 of this cylindrical part 9 and axial screws 24, via cylindrical spacer pieces 25 and 26. The intermediate spacer piece 25 having opposed openings 25a which correspond to the opposed openings 11 of the cylindrical part 9. Furthermore, the lower rings 19 and the outer rings 22 of the disks 18 are connected by branches 27 which do not run radially, their ends being angularly offset by about 60°.

The mounting attachment 1 further comprises two spring leaves 28 which run parallel to each other in a radial plane, one on each side of the cylinder 17a of the tool holder 17 and underneath the branches 16 of the angle brackets 15.

The central parts of the leaves 28 are engaged in opposed lateral slits 29 in the cylinder 17a of the tool holder 17. On each side of and at a distance from their central part, the leaves 28 are secured to the slideways 16a of the angle brackets 16 by sliders 30 and screws 31, so that they are adjustable in their lengthwise direction.

The upper sides of the slits 29 of the cylinder 17a are V-shaped so that they have a point 32 against which the leaves 28 rest. Furthermore, the cylinder 17a of the tool holder 17 has axial counterbores 33 which open into the slits 29 via their undersides and in which are arranged bearing fingers 34 held in these counterbores 33 by a peripheral ring 35 surrounding the cylinder 17a.

Screws 36 engaged at an angle in the cylinder 17a of the tool holder 17 rest against inclined undersides 37 of the fingers 34. The screws 36 allow the fingers 34 to be shifted upward so that their rounded upper ends 37a rest against the leaves 28 and press these against the tops 32 of the slits 29. Thus, the central parts of the leaves 28 are trapped axially, by point contact, between the tops 32 and the fingers 34.

The screws 31 of the slideways 16 and the screws 36 are accessible through the openings 11 and 25a.

Furthermore, the lower part of the cylinder 17a of the tool holder 17 has an axial bore 38 in which the upper part of the drilling head 2 is attached, using a binding screw 39.

Finally, the chuck 7 of the machine 3, the cylindrical part 5 of the support 4 and the tool holder 17 have axial passages 40, 41 and 42. The axial passage 42 in the support 4 and the axial passage 42 in the tool holder 17, which are some distance apart, are connected by a flexible serpentine pipe 43. Thus, the passage 40 in the chuck 7, the serpentine pipe 43 and the axial passage 42 in the tool holder 17 constitute a duct for conveying a fluid to an axial passage 44 in the drilling head 2.

The mounting attachment 1 which has just been described can be used as follows.

When the chuck 7 of the machine 3 and the support 4 which is connected to it move with respect to a workpiece, not depicted, that is to be drilled, under the effect of means for the controlled and constant advance of the machine 3, the drilling forces are transmitted to the tool holder 17 by the spring leaves 28. The guide disks 18 and the serpentine coil 43 are constructed in such a way as to be able to deform in such a way that their deformations have no appreciable influence on the said forces.

The forces associated with the penetration of the drilling head causes the spring leaves 28 to flex about the tops 32 of the slits 29 and about the opposed fingers 24 as far as the sliders 30.

As the stiffness of the spring leaves 28 and the position of the sliders 30 along the slideways 16a are well chosen, a phenomenon of self-sustained vibration causing reciprocating axial movements or axial oscillations of the drilling head 2 can therefore occur during the controlled advance of the support 4, and may advantageously be synchronized with the relative rotation of the drilling head 2 with respect to the workpiece that is to be drilled.

These reciprocating movements which are self-sustaining as the drilling head 2 advances may cause a variation in the thickness of the chip or chips formed.

Insofar as the retreating movement of the drilling head 2 with respect to the advance of the support 4 is such that its cutting edge or edges approach, reach, or pass beyond the surface machined by them, this variation in thickness may be such that the chips break up intermittently.

Thus, it may be far easier for the chips to be removed, particularly under the effect of the fluid conveyed through the attachment 1 and the drilling head 2.

Furthermore, particularly when drilling to a great depth, the self-sustaining axial oscillations or reciprocating axial movements of the drilling head 2 may, with or without the breaking-up of the chip or chips formed, allow any vibrations, particularly axial and/or transverse vibrations, of the drilling head with respect to the workpiece, to be absorbed, at least in part.

In consequence, the mounting attachment 1 makes it possible to improve the straightness of the drillings, reduce drill wear and improve the quality of the internal surface of the holes.

Figure 1:
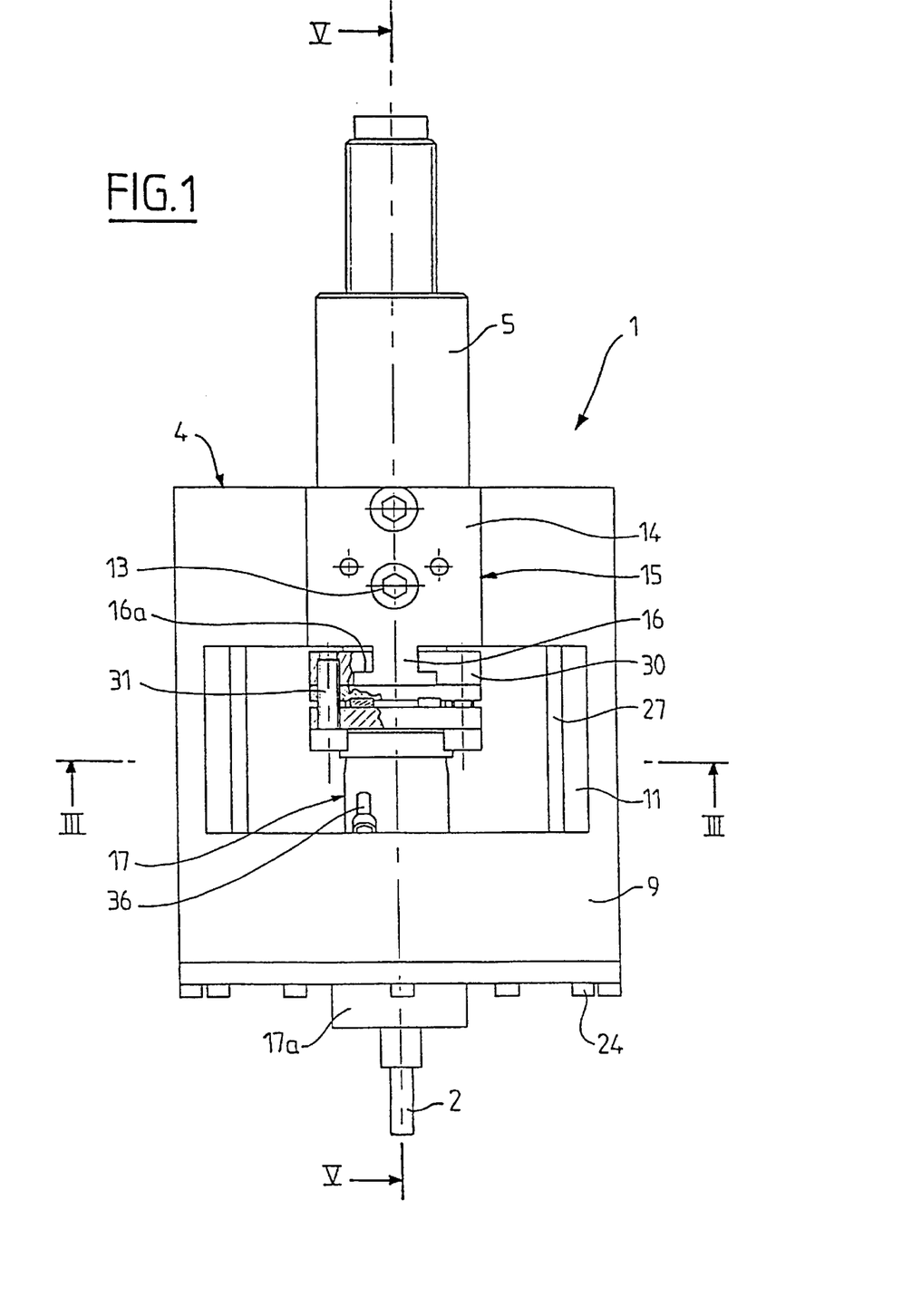
FIG. 1 depicts a side view in elevation of a first mounting attachment according to the invention.
Figure 2:
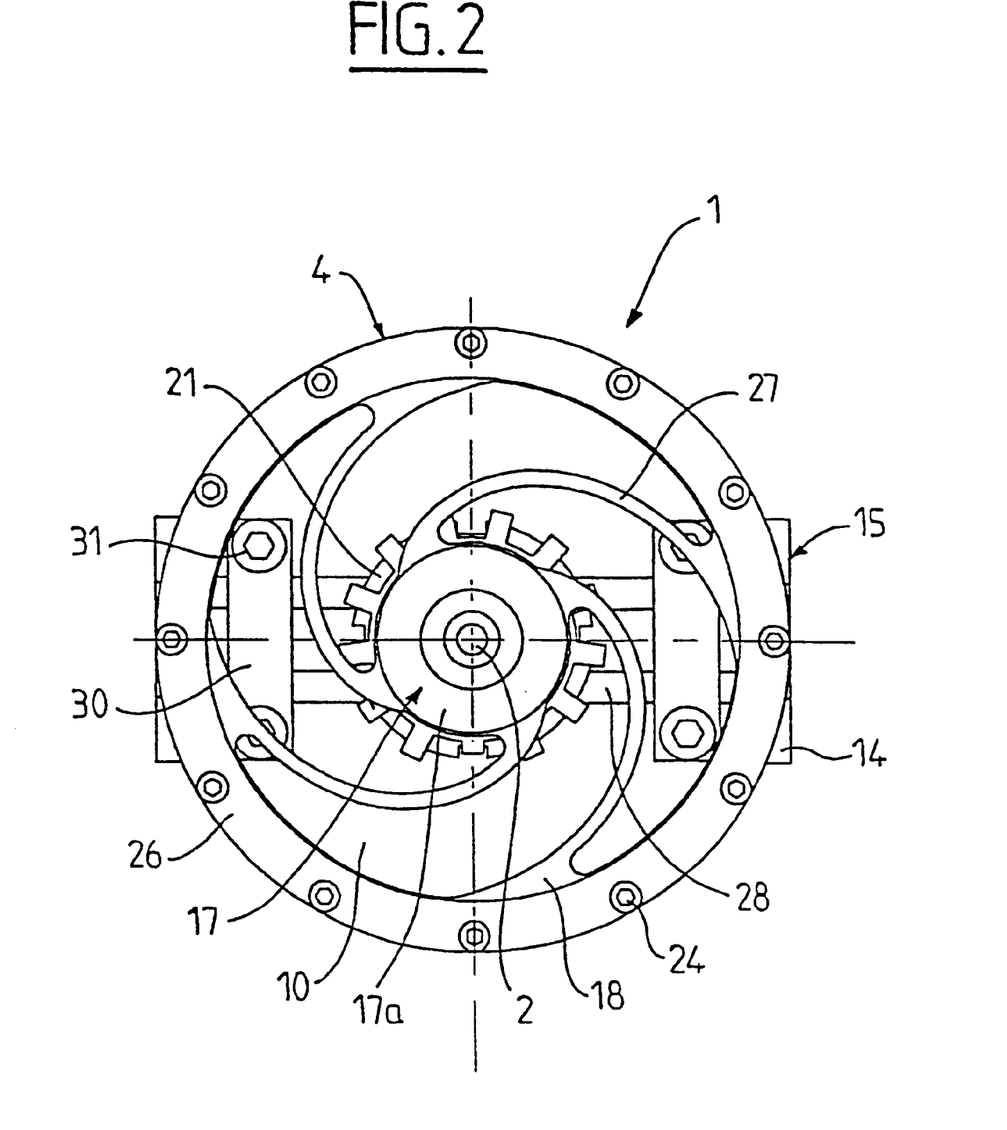
FIG. 2 depicts a view from beneath, from the tool end, of the mounting attachment of FIG. 1.
Figure 3:
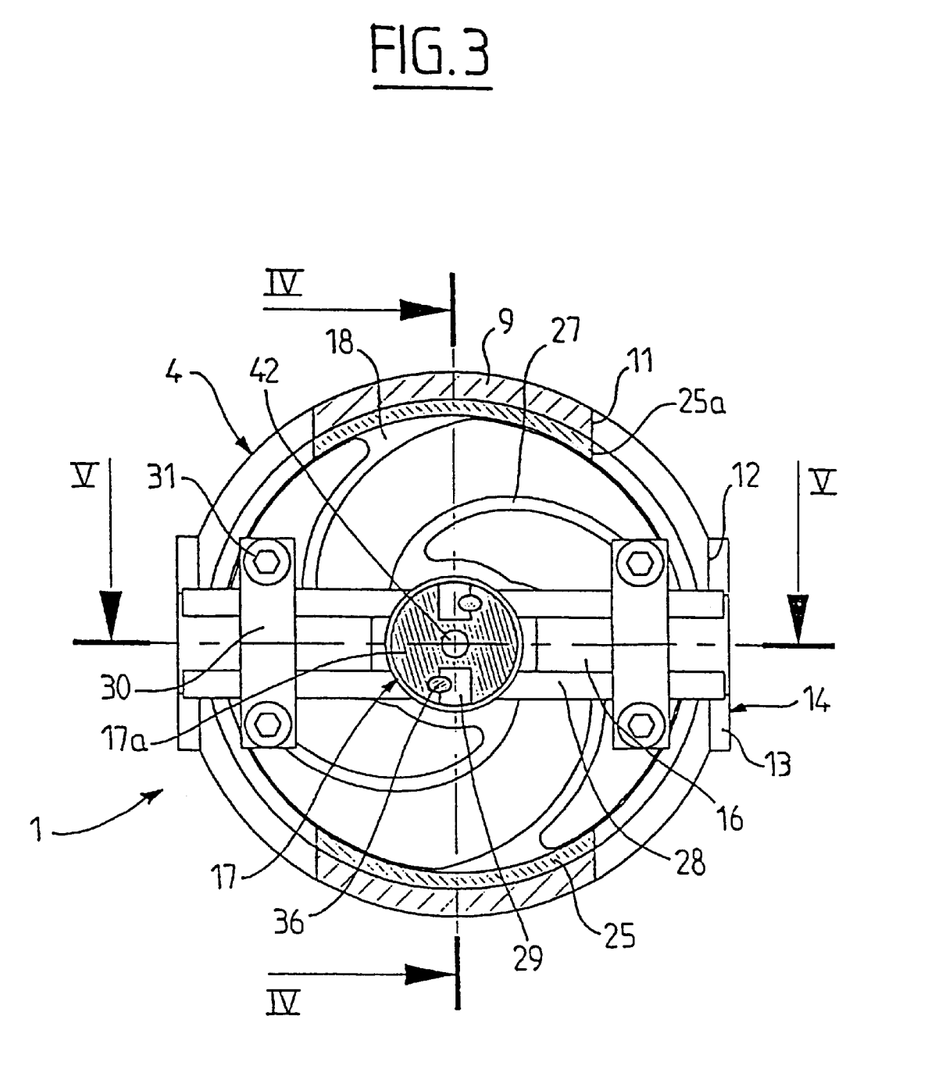
FIG. 3 depicts a radial section on III—III of the aforementioned mounting attachment, identified in FIGS. 1 and 5.
Figure 4:
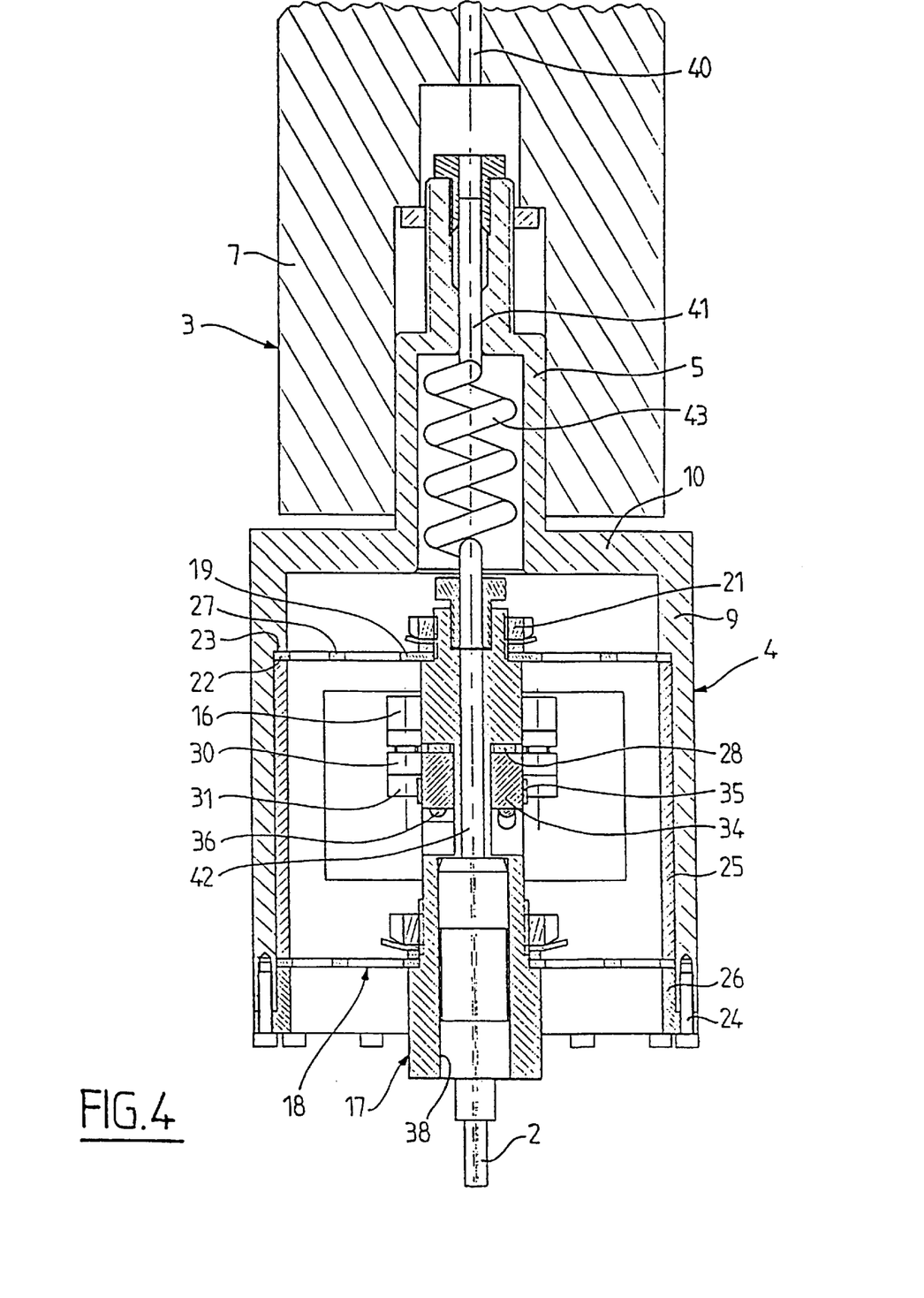
FIG. 4 depicts an axial section on IV—IV of the aforementioned mounting attachment, in the plane of FIG. 1 and identified in FIG. 3.
Figure 5:
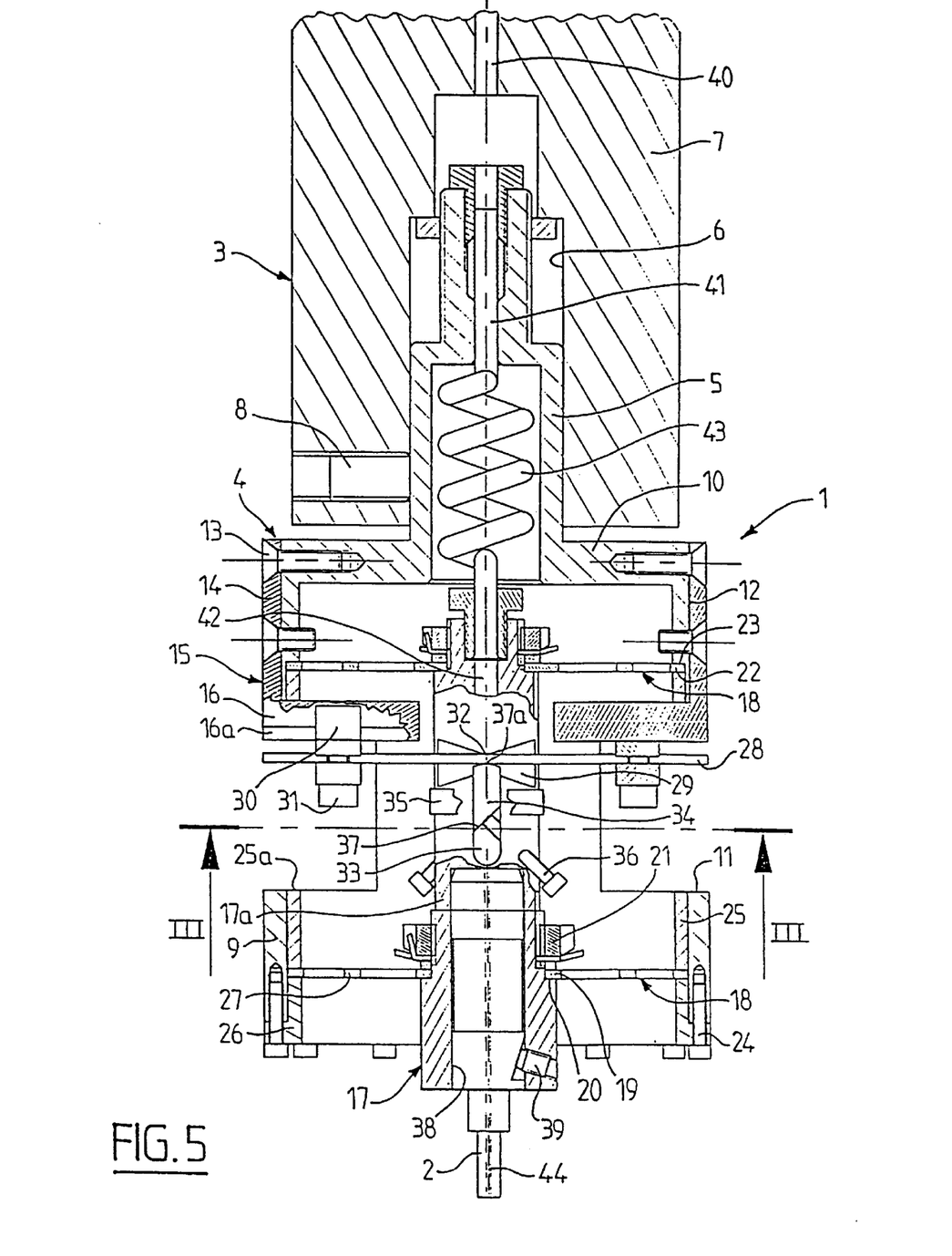
FIG. 5 depicts an axial section on V—V of the aforementioned mounting attachment, at right angles to the cutting plane of FIG. 4, identified in FIGS. 1 and 3.
Figure 6:
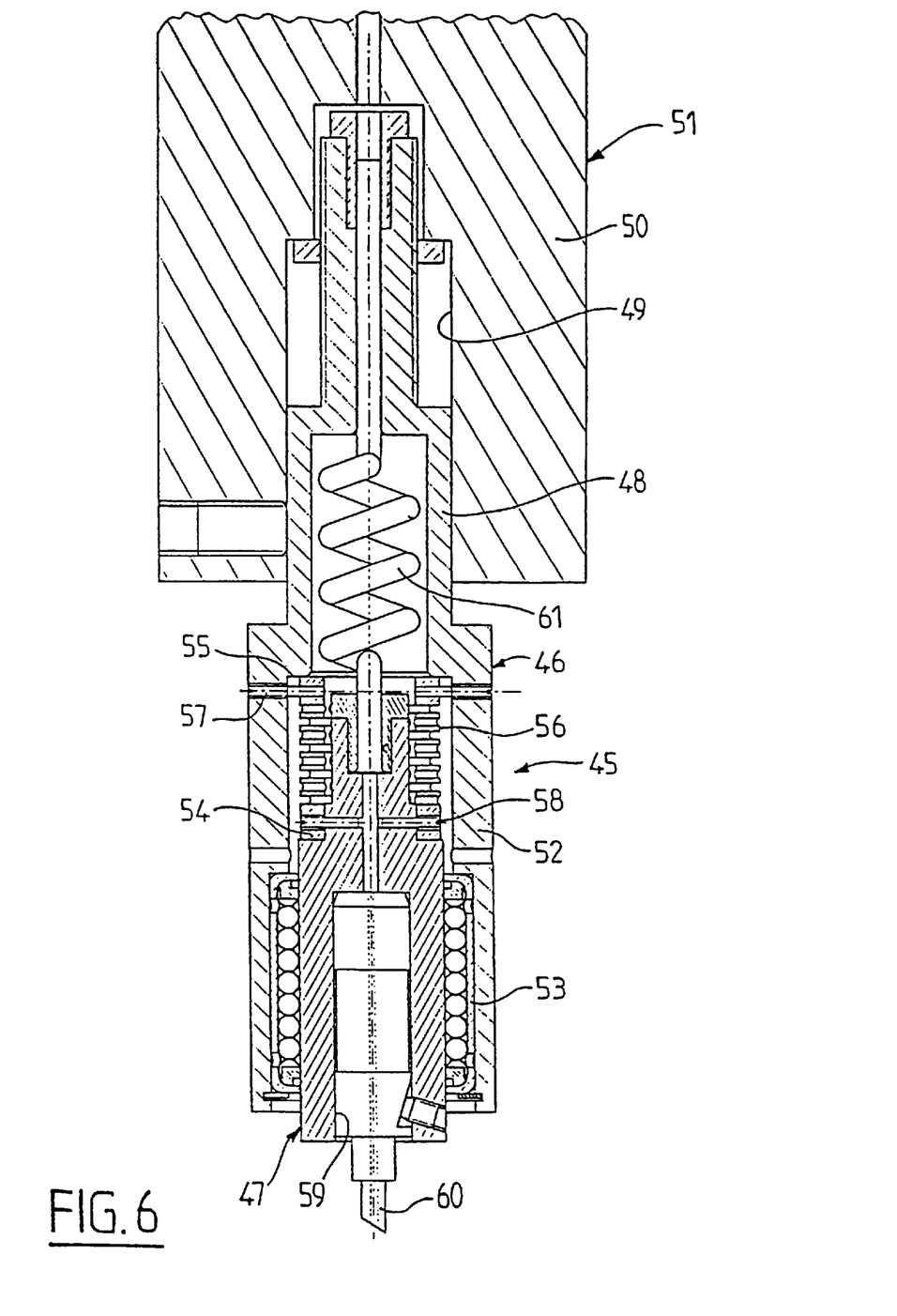
FIG. 6 depicts an axial section through a second mounting attachment according to the present invention.
Figure 7:
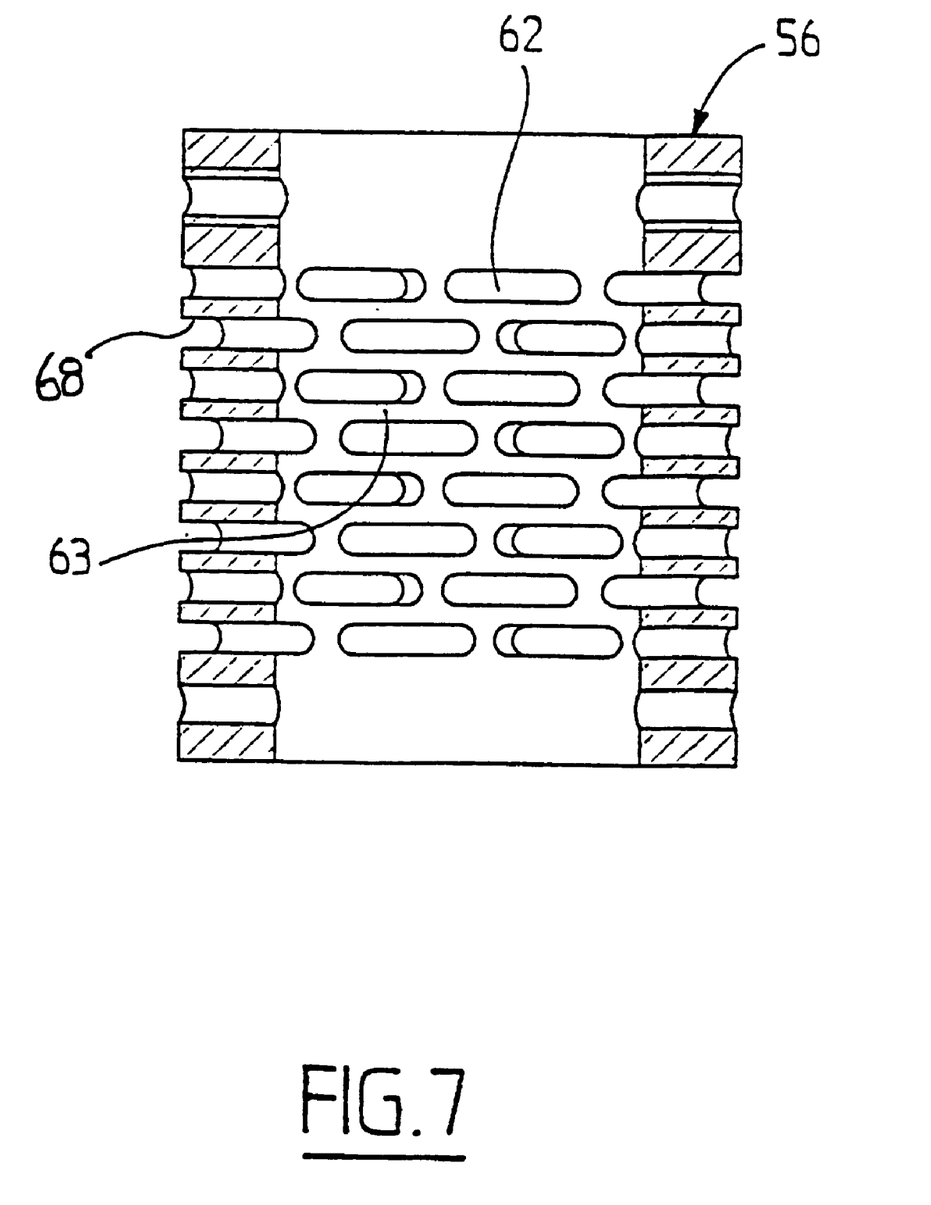
FIG. 7 depicts an axial section through a spring of the mounting attachment of FIG. 6.

Referring now to FIGS. 6 and 7, it may be seen that a simplified drilling head has been depicted, identified in general using the reference 45, which comprises a support 46 and a tool holder 47.

The support 46 has a cylindrical part 48 engaged in a bore 49 of a chuck 50 of a machine 51 and a cylindrical part 52 which extends the cylindrical part 48 and which has a slightly larger diameter. The tool holder 47 is in the form of a cylinder engaged inside and some distance from the cylindrical part 52 of the support 46.

Placed between the lower part of the tool holder 48 and the lower part of the cylindrical part 52 of the support 46 is a ball-type slideway 53 allowing the tool holder 47 to be guided axially with respect to the support 46.

The upper part of the tool holder 47 has a reduced diameter creating a shoulder 54. Placed between this shoulder 54 and the bottom 55 of the cylindrical part 52 of the support 46 is a spring 56 in the form of a cylinder. The upper part of this spring 56 is fixed to the upper part of the cylindrical part 52 of the support 56 by radial screws 57 and the lower part of the spring 56 is connected to the tool holder 47 by radial screws 58.

The tool holder 47 has a bore 59 in which a drill head 60 is secured.

As in the previous example, the chuck 50, the cylindrical part 52 of the support 46, the tool holder 47 and the drilling head 60 have a pipe for conveying a fluid, the duct in the support 46 and the duct in the tool holder 47 being connected, as before, by a serpentine coil 61.

Referring more specifically to FIG. 7, it may be seen that the cylindrical spring 56 is constructed from a cylinder, in the wall of which oblong openings 62 are machined in the peripheral direction, these openings being offset from one another in such a way as to form peripheral portions 68 which can be deformed elastically in the axial direction.

The mounting attachment 45 which has just been described with reference to FIGS. 6 and 7 works in the same way as the mounting attachment 1 described with reference to FIGS. 1 to 5.

Thus, the forces of the penetration of the drilling head 60 on the workpiece during the controlled advance of the support 46 with respect to the workpiece, not depicted, are achieved via a cylindrical spring 56, without the ball-type slideway 53 and the serpentine coil 61 having an appreciable influence on these forces.

The rotational forces are taken up by the screws 57 and 58 and by the cylindrical spring 56 in its peripheral direction. The axial forces are transmitted by the cylindrical spring 56, particularly by its inner portions 63.

To the extent that the dimensions and openings 62 of the spring 56 are correctly selected, self-sustaining reciprocating vibrating movements or axial oscillations of the drilling head can occur during the controlled advance of the support 46.

What is claimed is:

1. An attachment for mounting a penetrating tool on a machine, the attachment comprising:
    a support, provided with means for coupling the support to the machine;
    a tool holder for holding a tool;
    guiding means for guiding the tool holder along a machining axis with respect to the support; and
    elastically deformable suspension means for suspending the tool holder from the support, which suspension means allow axial translation and self-sustaining reciprocating or vibrating axial movements of the tool holder resulting from a controlled displacement of the support with respect to a workpiece.

2. The mounting attachment according to claim 1, wherein the attachment comprises means for adjusting the stiffness of the elastically deformable suspension means.

3. The mounting attachment according to claim 1, wherein the guiding means comprise two axially deformable plates having an inner ring and an outer ring joined together by non-radial branches, each of which plates is connected to the support and to the tool holder.

4. The mounting attachment according to claim 1, wherein the guiding means comprise a ball-type slideway.

5. The mounting attachment according to claim 1, wherein the elastically deformable suspension means comprise at least one spring leaf positioned in a radial plane, which is suspended from the support, and from which the tool holder is suspended.

6. The mounting attachment according to claim 5, wherein the at least one spring leaf is suspended from the support at two peripheral points along its length, and wherein the tool holder is suspended from the at least one spring leaf at a point along the length of the spring leaf between the two peripheral points.

7. The mounting attachment according to claim 1, wherein the elastically deformable suspension means comprise two spring leaves arranged parallel to each other in a radial plane, one on each side of the machining axis, each of the leaves being suspended from the support, and each of the leaves having the tool holder suspended therefrom.

8. The mounting attachment according to claim 7, wherein each of the spring leaves is suspended from the support at two peripheral points along its length, and wherein the tool holder is suspended from each of the spring leaves at a point along the length of the spring leaf between the two peripheral points.

9. The mounting attachment according to claim 6, further comprising means for adjusting the distance between the two peripheral points along the length of the at least one spring leaf.

10. The mounting attachment according to claim 8, further comprising means for adjusting the distance between the two peripheral points along the length of the spring leaf.

11. The mounting attachment according to claim 1, wherein the elastically deformable suspension means comprise at least one essentially cylindrical spring.

12. The mounting attachment according to claim 11, wherein the essentially cylindrical spring comprises a cylinder having offset openings in its wall which form peripheral portions which are elastically deformable in the axial direction.

13. The mounting attachment according to claim 11, wherein ends of the cylindrical spring are fixed to the support and to the tool holder.

14. The mounting attachment according to claim 1, wherein the support comprises a first cylindrical part coupled to the machine, and a second cylindrical part into which the tool holder at least partially extends.

15. The mounting attachment according to claim 1, further comprising means for conveying fluid to the tool, which fluid conveying means comprise a first duct running axially through the support, a second duct running axially through the tool holder, and an axially deformable pipe operably connecting the first and the second ducts.

* * * * *